United States Patent Office 3,451,691
Patented June 24, 1969

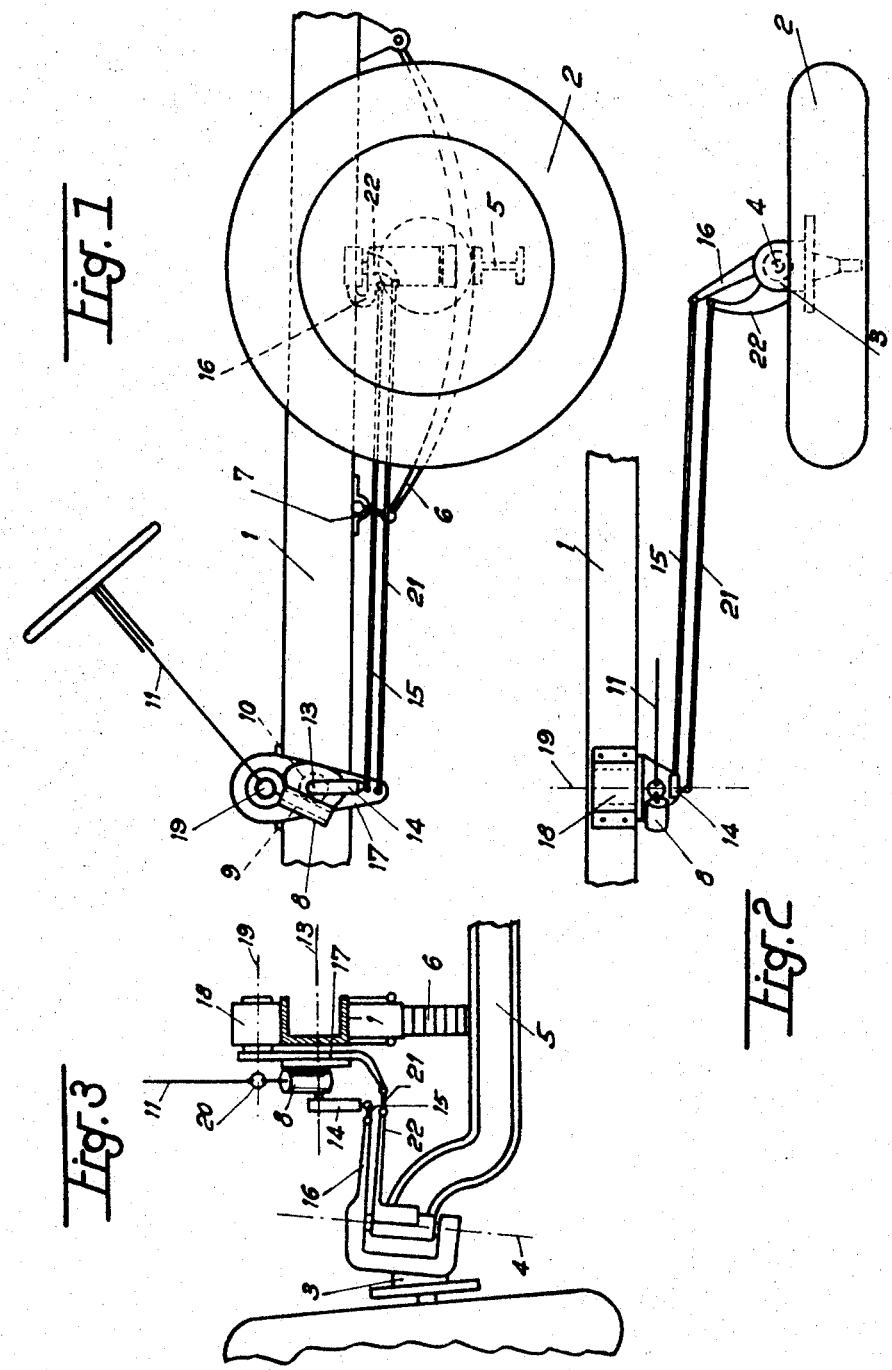

3,451,691
STEERING APPARATUS FOR VEHICLES
Edmond Henry-Biabaud, Paris, France, assignor to Société
Anonyme Automobiles Citroen, Paris, France
Filed Mar. 22, 1967, Ser. No. 625,255
Claims priority, application France, Mar. 29, 1966,
55,409
Int. Cl. B62d 3/02
U.S. Cl. 280—96                                    8 Claims

ABSTRACT OF THE DISCLOSURE

In a vehicle steering apparatus a steering box is pivotally mounted on the chassis and a steering crank is pivotally mounted on the steering box. A first set of mechanical links connects the steering crank to drive a wheel to be steered, while a second set of mechanical links lying adjacent the first set connects the steering box to the axle of the said wheel so as to render the steering insensitive to changes in the spacing between the wheel and the chassis.

---

The present invention relates to improvements in steering apparatus for vehicles.

The kinematics of the steering of an automobile vehicle is normally determined by assuming that the axle occupies a given position with respect to the chassis. Now, in fact, this position varies, in particular with load. Consequently, in steering apparatus constructed up to present time, a change in the position of the axle with respect to the chassis has an effect on the steering of the wheels.

The present invention has for its object improvements relating to the steering apparatus of automobile vehicles with the aim of at least partially remedying this disadvantage.

The present invention provides a vehicle steering apparatus in which the steering box or relay connected by a steering rod to the steering axle is pivotally mounted with respect to the vehicle chassis, about an axis parallel to the axis of the steering crank of the box or the relay, wherein the steering box or relay axis intersects the axis of a steering wheel or a relay controller and wherein the connection between the box or the relay and the steering axle further includes an auxiliary rod substantially parallel to the steering rod and also of substantially the same length.

The present invention further provides vehicle steering apparatus including a steering transmission mechanism having a first and a second portion, said first portion bein gpivotally mounted with respect to the vehicle chassis and said second portion being pivotable with respect to said first portion in response to a steering control force, first means connecting said portion to control a wheel to be steered and second means connecting said first portion to a fixed axle of the wheel, whereby to render the steering of said wheel substantially insensitive to variations in the spacing between the wheel and the chassis.

An embodiment of vehicle steering apparatus in accordance with the present invention will now be described by, way of example, with reference to the accompanying diagrammatic drawing, in which;

FIGURE 1 is a view in elevation of the steering apparatus;

FIGURE 2 is a plan view of the apparatus of FIGURE 1; and

FIGURE 3 is a front view of the apparatus of FIGURE 1.

The drawing, shows the chassis 1 of an automobile vehicle and one of the front wheels 2. The stub axle 3 of the wheel is pivotally mounted about an axis 4 on the steering axle 5. The latter is connected to the chassis 1 by a suspension which, in the embodiment shown, comprises a spring 6, having a fixed pivot and a spring shackle 7.

The steering box or relay 8 comprises, in the usual manner, a worm screw 9 engaged with a steering segment or sector 10. The worm screw 9 is connected to the steering column 11, the segment 10 being pivotally mounted about an axis 13 and connected to the steering crank 14. The latter is connected by a rod 15 to the steering arm 16 of the wheel which is connected to the spindle 3.

The steering box 8, instead of being fixed to the chassis, is fixed to an auxiliary support 17 which is oscillably mounted by a pivot 18. The axis 19 of this pivot is parallel to the axis 13 and passes through the intersection of the axis of the worm screw 9 and the axis of the steering column 11; it is thus possible to connect the worm screw 9 and the steering column 11 by a homokinematic joint 20 or by a single suitably orientated universal joint whose centre is on the axis 19.

The support 17 is connected by a rod 21 to an arm 22 rigidly fixed to the axle 5. This rod 21 is parallel to the rod 15 and which is as near as possible of the same length. On its ends are mounted ball and socket joints which are placed as near as possible the ends of the rod 15, so that, in the position for linear travel, the two rods 15 and 21 are practically merged. On the other hand, the point of attachment on the axle 5 of the arm 22 is situated as near as possible to the point of attachment of the arm 16 on the axis 4.

The drawing shows, in the position for linear travel that:

On the one hand, the displacements of the axle 5 with respect to the chassis 1 will tend to modify the distance of the ball and socket joint of the arm 16 of the axis 4, from the ball and socket joint of the steering crank 14 of the steering box. But, on account of the connection of the bar 21, between the axle 5 and the support 17, an oscillation of the steering box 8 follows and thereby, the distance between the two ball and socket joints remains constant;

On the other hand, the oscillations imparted to the steering box 8 have no effect on the steering column 11 because the connection of the axis of the screw 9 to the axis of the steering column 11 is provided by the homokinematic joint 29 whose centre is on the axis of oscillation 19.

All variations in the position of the axis with respect to the chassis, that result from movement of the suspension, the play of the points of attachments of the springs and of the spring shackles, or of the deformations of the axle, no longer have here any effect on the steering and, the pursuit of the instantaneous centre of turn becomes unnecessary.

The steering transmission as described in the form of a steering box which is controlled directly by a steering column, can alternatively be in the form of relay which is controlled by a hydraulic servo-mechanism.

I claim:
1. In vehicle steering appartus including
  a steering transmission mechanism,
  means mounting the mechanism pivotally with respect to the chassis of the vehicle,
  steering crank means,
  means mounting the crank means pivotally with respect to the mechanism about an axis parallel to the pivot axis of the mechanism,
  a steering axle of the vehicle,
  means connecting the crank means to the steering axle including steering rod means,
the improvement comprising
a steering transmission controller mounted about an axis which intersects the pivot axis of the mechanism, and
means connecting the mechanism to the said vehicle steering axle including
auxiliary rod means of substantially the same length as the steering rod means, and
means mounting the auxiliary rod means in substantially parallel relation to the steering rod means.

2. Apparatus according to claim 1 wherein said steering transmission mechanism includes
a worm screw and a tangent segment assembly, and
means coupling said worm screw and steering transmission controller, at the intersection of the controller and mechanism axes.

3. Apparatus according to claim 1, wherein in the position for rectilinear travel of the vehicle, the means mounting the auxiliary rod means align the auxiliary rod means with and adjacent to the steering rod means.

4. Apparatus according to claim 1, wherein the means connecting the steering crank means to the steering axle further includes
a first arm connecting the steering rod to a pivot on the axle, and wherein the means connecting the steering transmission mechanism to the steering axle includes
a second arm connecting the auxiliary rod to the axle adjacent said pivot.

5. In steering apparatus for a vehicle comprising a chassis, a fixed axle and wheels mounted on said fixed axle, a steering transmission mechanism having a first portion pivotally mounted with respect to the chassis, and a steering column, mounted on said first portion, and a universal joint, connecting the steering column to said first portion, and lying on the pivot axis of said first portion, and a second portion pivoting with respect to said first portion in response to a steering control force, first means connecting said second portion to a said wheel, and second means, connecting said fisrt portion to the fixed axle on which said wheel is mounted whereby to render steering of the vehicle substantially insensitive to variations in spacing between said wheel and said chassis.

6. Apparatus according to claim 5 including
means transmitting said steering control force from said steering column to said second portion, including
a worm screw and segment arrangement.

7. Apparatus according to claim 5 wherein said first means comprises a first arm pivoting said wheel with respect to said fixed axle of the wheel, and a first rod, connecting said second portion to said first arm, and wherein said second means comprises a second arm, rigid with said axle, a second rod, substantially equal in length to said first rod, connecting said first portion to the second arm, and means mounting the second rod substantially parallel to the first rod.

8. Apparatus according to claim 7 including
means mounting said two arms on said axle, whereby the intersection of the axes of the arms lies on said axle.

References Cited

UNITED STATES PATENTS

| 1,197,581 | 9/1916 | Masury | 280—96 |
| 1,234,014 | 7/1917 | Hallner | 280—96 |
| 1,666,104 | 4/1928 | McMurtrie | 280—93 |
| 2,085,021 | 6/1937 | Hickman | 280—95 |

KENNETH H. BETTS, *Primary Examiner.*